United States Patent [19]

Watanabe

[11] 4,045,142
[45] Aug. 30, 1977

[54] METERING DEVICE FOR CAMERAS

[75] Inventor: Sakuji Watanabe, Yono, Japan

[73] Assignee: Nippon Kogaku K.K., Tokyo, Japan

[21] Appl. No.: 681,506

[22] Filed: Apr. 29, 1976

[30] Foreign Application Priority Data

May 16, 1975 Japan .................. 50-57435

[51] Int. Cl.² .................. G01J 1/42; G03B 7/08; G03B 7/00
[52] U.S. Cl. .................. 356/223; 250/201; 250/205; 356/226; 354/24; 354/60 E
[58] Field of Search .............. 356/223, 226; 250/201, 250/205, 214 B, 214 P; 354/24, 60 R, 60 E; 328/145; 307/230

[56] References Cited
U.S. PATENT DOCUMENTS

| 3,704,950 | 12/1972 | Rosencrantz | 356/223 |
| 3,781,119 | 12/1973 | Mori | 356/223 |
| 3,859,519 | 1/1975 | Weischedel | 250/214 B |
| 3,928,860 | 12/1975 | Numata et al. | 354/60 R |
| 3,977,011 | 8/1976 | Matsuda | 356/223 |

Primary Examiner—John K. Corbin
Assistant Examiner—Stewart Levy
Attorney, Agent, or Firm—Fitzpatrick, Cella, Harper & Scinto

[57] ABSTRACT

In a metering device for cameras comprising an operational amplifier, a photodiode connected between the positive and the negative input terminal of the operational amplifier, and a logarithmic conversion diode connected between the negative input terminal and the output terminal of the operational amplifier, the electric charge stored in the capacity present in the photodiode due to noise may be discharged to a capacitor which is adapted to reduce its potential in synchronism with the output potential drop of the operational amplifier.

2 Claims, 1 Drawing Figure

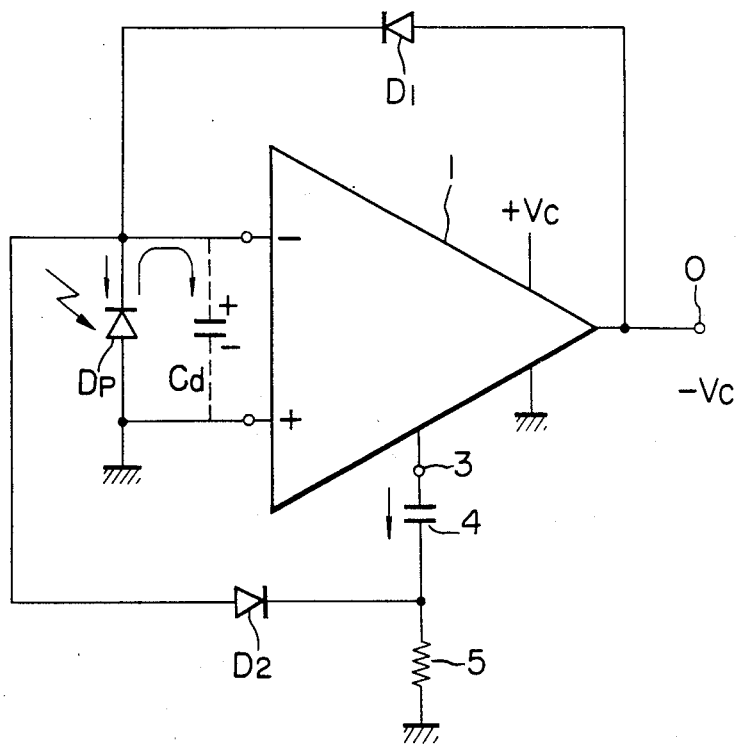

METERING DEVICE FOR CAMERAS

BACKGROUND OF THE INVENTION

1. Field of the Invention

This invention relates to a metering device for cameras, and more particularly, to a metering device in which the aggravation of photo-responsive characteristic attributable to the capacity present in the light-sensing element has been corrected.

2. Description of the Prior Art

A metering device for cameras is well-known in which a photodiode is connected between the positive and the negative input terminals of an operational amplifier and a logarithmic conversion diode is connected between the negative input terminal and the output terminal of the operational amplifier so that an exposure meter may be controlled by the output of the operational amplifier.

However, the presence of the capacity in the photodiode causes an electric charge to be stored in the capacity when some noise enters the device, and a potential difference is thus created between the positive and the negative input terminals of the operational amplifier thereby sharply to drop the output potential of the operational amplifier. Unfortunately, a relatively long time is required before such charge stored in the capacity is exhausted by natural discharge and during that time, the output potential of the operational amplifier remains low and the operational amplifier becomes irresponsive to the light which enters the photodiode. This has led to aggravation of the photoresponsive characteristic of the metering device.

SUMMARY OF THE INVENTION

I contribute by my present invention a metering device for cameras by which I am able to overcome the foregoing difficulties and disadvantages and the photoresponsive characteristic of which has been corrected.

According to the present invention, the metering device comprises an operational amplifier, a photodiode connected between the positive and the negative input terminals of the operational amplifier, and a logarithmic conversion diode connected between the negative input terminal and the output terminal of the operational amplifier. A terminal is provided on the operational amplifier for producing an output synchronous with the output potential thereof. A CR circuit is connected to that terminal and comprises a capacitor and a resistor series-connected together. The CR circuit is adapted to constitute a charging circuit when the output of the operational amplifier is within the range of metering potential and to constitute a short circuit when the output of the operational amplifier is below the range of metering potential. A discharging diode is connected between the junction between the capacitor and the resistor and the negative input terminal of the operational amplifier. Thus, the charge stored in the capacity present in the photodiode due to noise may be discharged through the discharging diode to the capacitor thereby to correct the photoresponsive characteristic of the metering device.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWING

Specific embodiments of the invention have been chosen for purposes of illustration and description, and are shown in the accompanying drawing, forming a part of the specification, wherein:

The FIGURE of the drawing is a circuit diagram showing an embodiment of the present invention.

DESCRIPTION OF THE PREFERRED EMBODIMENTS

Referring to the drawing, which shows an embodiment of the present invention, the anode of a photodiode Dp is connected to the positive input terminal (+) of an operational amplifier 1 biased by a positive voltage +Vc, and the cathode of the photodiode Dp is connected to the negative input terminal (−) of the operational amplifier. A capacity Cd is present in the photodiode Dp and the anode of the photodiode Dp is grounded. The cathode and anode of a logarithmic conversion diode D1 are respectively connected to the negative input terminal (−) and the output terminal O of the operational amplifier 1, thus forming a negative feedback circuit. A capacitor 4 has one pole thereof connected to the terminal 3 of the operational amplifier 1 and the pole connected to a resistor 5 which has one end grounded. A discharging diode D2 has the cathode thereof connected to the junction between the capacitor 4 and the resistor 5, and has the anode thereof connected to the negative input terminal (−) of the operational amplifier 1.

The terminal 3 of the operational amplifier 1 is led out at a point in the operational amplifier circuit whereat the potential of the operational amplifier varies in synchronism with variations in output potential of the operational amplifier.

Operation of the shown embodiment will now be described.

Where there is no noise coming into the metering device, there is produced at the output terminal O of the operational amplifier a potential corresponding to the light which enters the photodiode Dp, within the range of the metering potential corresponding to the metering range of the metering device. In this case, the capacitor 4 and the resistor 5 together constitute a charging circuit which effects charging in accordance with the time constant determined by the capacity of the capacitor 4 and the resistance value of the resistor 5.

If noise comes into the metering device, the capacity Cd is charged with the opposite polarity to that of the positive and the negative input terminal of the operational amplifier. Thus, the potential at the output terminal O of the operational amplifier 1 sharply drops to the ground potential which is below the range of the metering potential corresponding to the metering range of the metering device. On the other hand, in synchronism with such drop of the output potential, the potential at the terminal 3 drops to the ground potential which is the same as the ground potential of the resistor 5, so that the capacitor 4 and the resistor 5 constitute a short circuit. As a result, the potential at the junction between the capacitor 4 and the resistor 5 drops below the ground potential of the photodiode Dp by an amount corresponding to the charging voltage of the capacitor 4.

Thus, the charge in the capacity Cd is quickly discharged through the discharging diode D2 to the capacitor 4, so that the output potential of the operational amplifier 1 restores the potential level corresponding to the light which is entering the photodiode Dp. When this occurs, the capacitor 4 also discharges, and if the capacity thereof and the resistance of the resistor 5 are preselected to relatively great values, the charge in the capacity Cd may be discharged without any inconvenience even if noise frequently comes into the metering device.

In the present embodiment, the operational amplifier 1 is biased by +Vc, but this is not the only possible way of biasing the operational amplifier.

According to the present invention, as has been described above, the charge stored in the capacity present in the photodiode due to noise may be discharged, in synchronism with the output potential drop of the operational amplifier, to the capacitor which is at a lower potential than the ground potential of the photodiode, whereby there may be provided a metering device whose photoresponsive characteristic has been corrected.

I believe that the construction and operation of my novel metering device for cameras will now be understood and that the advantages thereof will be fully appreciated by those persons skilled in the art.

I claim:

1. In a metering device comprising an operational amplifier, a photodiode connected between the positive and the negative input terminal of said operational amplifier, and a logarithmic conversion diode connected between the negative input terminal and the output terminal of said operational amplifier, the improvement comprising:

a terminal provided on said operational amplifier for producing an output synchronous with the output potential thereof;

means connected to said terminal and constituting a charging circuit when the output of said operational amplifier is within the range of metering potential and a short circuit when the output of said operational amplifier is below the range of metering potential; and means connected between the junction between said charging circuit and said negative input terminal of said operational amplifier;

whereby the charge stored in the capacity present in said photodiode due to noise may be discharged through said second mentioned means to said charging circuit thereby to correct the photoresponsive characteristic of said metering device.

2. A metering device according to claim 1, wherein said first mentioned means is a CR circuit comprising a capacitor and a resistor series-connected, and said second mentioned means is a discharging diode.

* * * * *